United States Patent
Furchheim et al.

(10) Patent No.: US 6,961,998 B2
(45) Date of Patent: Nov. 8, 2005

(54) METHOD FOR PRODUCING A HOLLOW SHAFT, IN PARTICULAR A CAMSHAFT AND A CAMSHAFT PRODUCED ACCORDING TO SAID METHOD

(75) Inventors: Bodo Furchheim, Chemnitz (DE); Franz-Josef Schleifstein, Schmallenberg (DE)

(73) Assignee: Salzgitter Antriebstechnik GmbH & Co. KG, Crimmitschau (DE)

( * ) Notice: Subject to any disclaimer, the term of this patent is extended or adjusted under 35 U.S.C. 154(b) by 327 days.

(21) Appl. No.: 10/381,037

(22) PCT Filed: Sep. 24, 2001

(86) PCT No.: PCT/DE01/03666

§ 371 (c)(1),
(2), (4) Date: Mar. 21, 2003

(87) PCT Pub. No.: WO02/28564

PCT Pub. Date: Apr. 11, 2002

(65) Prior Publication Data
US 2004/0034975 A1    Feb. 26, 2004

(30) Foreign Application Priority Data
Sep. 29, 2000  (DE) ................. 100 49 047
Sep. 29, 2000  (DE) ................. 100 49 048

(51) Int. Cl.$^7$ ................... B21K 1/06; B21K 1/08
(52) U.S. Cl. .............. 29/888.1; 29/507; 29/522.1; 29/523; 29/421.1; 29/6.01; 72/57; 72/370.13; 403/280
(58) Field of Search ............... 29/888.1, 507, 29/522.1, 523, 421.1, 6.01; 72/54, 57, 377, 72/370.1, 370.13; 74/567; 123/90.6; 403/276, 403/280

(56) References Cited

U.S. PATENT DOCUMENTS

| | | | | |
|---|---|---|---|---|
| 4,010,533 A | * | 3/1977 | Pitner .................... | 29/523 |
| 4,660,269 A | | 4/1987 | Suzuki | |
| 5,157,832 A | * | 10/1992 | Hughes .................. | 29/888.1 |
| 5,165,304 A | * | 11/1992 | Swars .................... | 74/567 |
| 5,184,495 A | | 2/1993 | Chunn et al. | |
| 5,259,268 A | * | 11/1993 | Ebbinghaus et al. .... | 74/567 |
| 5,280,672 A | * | 1/1994 | Hochstein ............... | 29/888.1 |
| 6,347,451 B1 | * | 2/2002 | Bloecker et al. ........ | 29/888.1 |

FOREIGN PATENT DOCUMENTS

DE    3409541 A1    3/1984

(Continued)

*Primary Examiner*—Eric Compton
(74) *Attorney, Agent, or Firm*—Whitham, Curtis & Christofferson, PC

(57) ABSTRACT

Hollow shafts, and particularly camshafts, are produced using an internal high-pressure forming (IHF) process. Cams and/or machine elements are mounted at intervals onto the outer surface of the hollow shaft, depending on the use of the latter, by a non-positive and/or positive fit, in a position appropriate to their function when the hollow shaft is placed in the forming tool. An element with approximately the same external diameter as the internal diameter of the hollow shaft is placed in at least one of the hollow shaft, and the hollow shaft together with the cams and/or machine elements that have been pushed onto the same and the inserted element are placed in an IHF tool. Once the IHF tool is closed, the medium is caused to act under the required high-pressure in the hollow shaft. At the same time as the medium is acting internally, at least one ram is pressed axially against at least one front face of the hollow shaft. Thus, filling the IHF mould with a material flow induced by the pressure effect of the medium and the mechanical pressure of the ram. The element is thus enclosed by the material of the hollow shaft and the cams and/or elements are connected to the hollow shaft by the non-positive and/or positive fit by means of the expansion of the hollow shaft. The end of the hollow shaft sealed by the element is mechanically machined to suit functional requirements.

20 Claims, 1 Drawing Sheet

FOREIGN PATENT DOCUMENTS

| | | |
|---|---|---|
| DE | 3616901 A1 | 5/1986 |
| DE | 3800912 A1 | 1/1988 |
| DE | 3941718 A1 | 12/1989 |
| DE | 19710848 A1 | 3/1997 |
| DE | 29918298 U1 | 7/1999 |

* cited by examiner

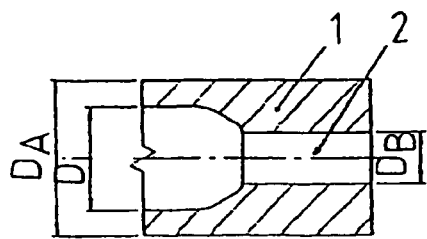
Fig 1a  PRIOR ART
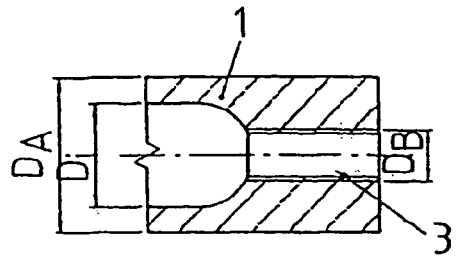
Fig 1b  PRIOR ART
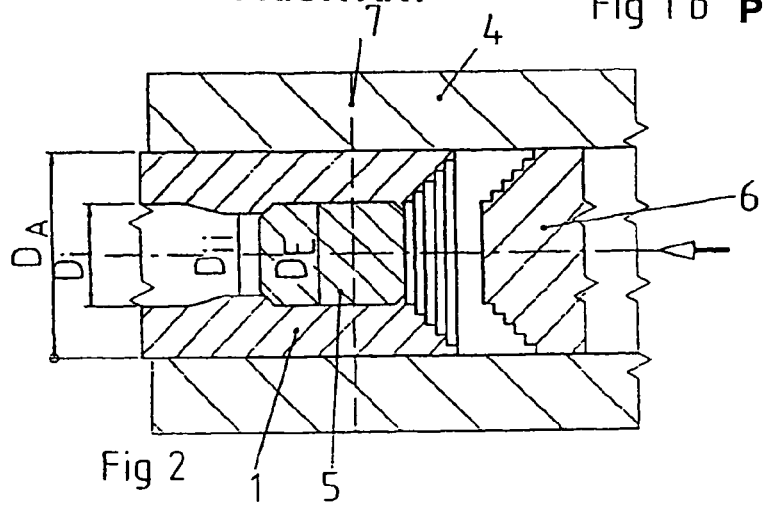
Fig 2
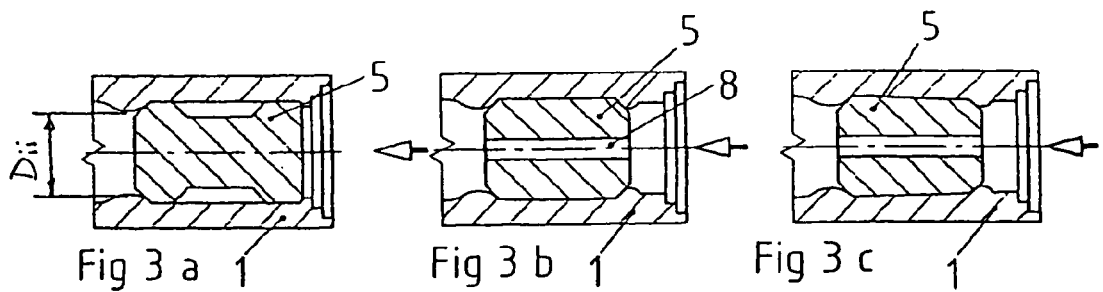
Fig 3a    Fig 3b    Fig 3c
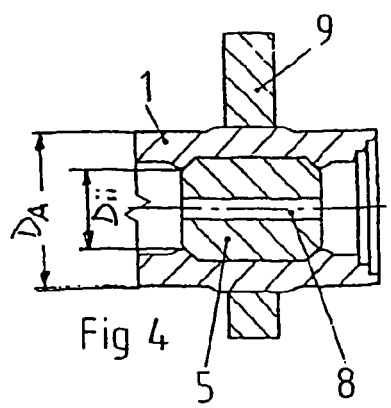
Fig 4
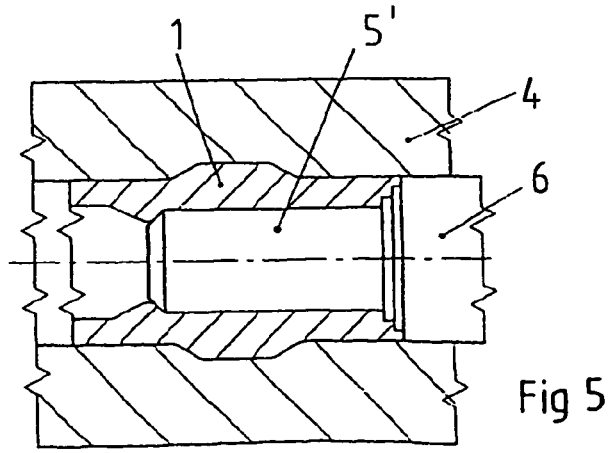
Fig 5

METHOD FOR PRODUCING A HOLLOW SHAFT, IN PARTICULAR A CAMSHAFT AND A CAMSHAFT PRODUCED ACCORDING TO SAID METHOD

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION (1) Field of the Invention

The invention relates to a method of producing a hollow shaft, in particular a camshaft, according to the internal high-pressure forming process (IHF), cams and/or machine elements being mounted on the outer lateral surface of the hollow shaft, in such a way as to be adapted to the use of the latter, in a frictional and/or positive-locking manner and so as to be distributed in functionally correct positions. The machine elements may be, for example, gears, drives, cam plates or the like. A preferred field of application is camshafts for motor vehicle engines.

(2) Description of the Related Art including information disclosed under 37 CFR 1.97 and 1.98

It is known to produce camshafts for motor vehicle engines by the internal high-pressure forming process (IHF) by a hollow shaft being widened by the action of pressure after the cams have been pushed on. Liquids are preferably used as pressure medium. In this case, the cams which are pushed on are connected to the shaft in a frictional and positive-locking manner (DE 34 09 541 A1). Even if this process proves to be very effective for mounting machine elements and cams on the shaft and is used in practice, shafts produced in this way still have the shortcoming that, at their ends, functional elements separately produced in a further process have to be connected to the shaft. Bolts are inserted into the shaft with an appropriate snug fit and are frictionally connected to the shaft by pins. It is also conventional practice to weld these bolts to the shaft or to press them into place. These bolts either project from the shaft and are provided with a thread in this region or they have an internal thread.

The general trend in mechanical engineering, in particular in the construction of motor vehicle engines, is to reduce the weight with the output being at least the same. To this end, the camshafts have for some time been used as hollow shafts. In this case, the persons skilled in the art have endeavored to produce these hollow shafts in such a way that the requisite machine elements are also connected to the hollow shaft in a highly reliable manner and at a low production cost.

There are applications of hollow shafts in which a connection to drives is necessary at one end or both ends. For this purpose, it is known to configure these machine elements in such a way that they are designed as a sleeve which are pushed onto the shaft and fastened. At the outer end, the machine element is designed as a flange, at which the coupling is effected (DE 38 00 912 A1). In this case, there are shortcomings with regard to the high mechanical production cost for the element, the accurate fit on the shaft and the frictional connection to the shaft. The connection may also be produced by IHF, but all the shortcomings are not removed.

It is known to form the ends of the hollow shaft by rotary swaging or upsetting in such a way that a thickness increase takes place, the inside diameter is reduced and the outside diameter, by material accumulation, is brought to such a size that a machine element mounted in a known manner is fastened. In this case, the end of the shaft is to be upset by an IHF process in such a way that a collar or flange is produced. These process steps can also be carried out by swaging or rotary swaging (DE 197 10 84.8).

All of the known processes for producing elements connected to the hollow shaft for the purpose of coupling or mounting have the disadvantage in common that the process for producing and for connecting said elements to the shaft in a frictional and positive-locking manner requires at least one additional process step. In addition to this there is also the mechanical treatment. For example, joining processes are necessary and subsequent hardening and/or machining. In addition, a machine fit is required, which in turn increases the cost.

BRIEF SUMMARY OF THE INVENTION

The object of the invention is to configure the method mentioned at the beginning in a more efficient manner.

According to the invention, this object is achieved according to claim 1. Claims 2 to 11 show advantageous configurations of the method. A hollow shaft produced according to the invention is defined in claim 12; claims 13 to 18 relate to expedient configurations of this hollow shaft.

According to the invention, two processes known per se independently of one another are combined. The IHF process is applied with the upsetting approximately at the same time.

Machine elements, e.g. gears and/or cams, are arranged on the hollow shaft in accordance with its function and are pushed onto the hollow shaft into their function-related position. This hollow shaft with components thus pre-fitted is inserted into an IHF tool. In a known manner, a plunger is moved in the axial direction at least toward one end of the hollow shaft with the pressure medium of the IHF tool acting at the same time. As a result, the hollow shaft is widened to a relatively pronounced extent at the locations at which no machine element is positioned on the outside, whereas, in the region where a machine element is positioned, the latter is connected in a frictional and positive-locking manner by the internal pressure. At the same time, the hollow shaft with the inserted element is upset by the pressure effect and by the movement of the plunger in the axial direction, as a result of which the thickness of the material is increased and the element is positioned in the hollow shaft in a frictional and positive-locking manner and thus, due to its form adapted to the use of the hollow shaft, serves as a termination of the hollow shaft and as a connection to other units.

Depending on the geometrical design of the inserted element, this upsetting causes material of the hollow shaft to be brought in front of and/or behind said element. The element is thus locked in the axial direction. If an axially continuous bore is made in the element, the pressure comes into effect on both sides of this element.

In accordance with the use of the hollow shaft, preferably as a camshaft, i.e. its bearing arrangement, connection to corresponding units of an engine or other drive elements, the element is mechanically cut off together with the hollow shaft and a plane surface is produced in the process. A bore or a thread, for example, is made in the latter.

In adaptation to the function of the hollow shaft, it is also possible for the element, after it has been connected to the hollow shaft, to be mechanically treated in such a way that a bolt or a threaded bolt remains. In this embodiment, the element may also already be prefabricated in its shape before being inserted and connected to the hollow shaft.

A further embodiment of the solution is that the element forms a unit with the plunger of the IHF tool, which acts axially at the same time as the pressure medium, and projects into the hollow shaft. After completion of the IHF process, the plunger together with the element is withdrawn. Depending on the configuration of the IHF tool and of the diameter of the element, the end of the hollow shaft is given the shape required for the function. The final size is produced by known mechanical treatment.

If the element remains in the hollow shaft, the element is locked in the axial direction, i.e. it is connected to the hollow shaft in a frictional and positive-locking manner.

It may also be advantageous to reduce the element in diameter between its two ends, as a result of which the connection to the hollow shaft is improved.

Depending on the intended use of the hollow shaft, it may be advantageous to cut off the hollow shaft at the end face in the region of the element after the element has been pressed in, so that a plane surface is produced. The cutting-off is expediently effected by cut-off grinding. An axially running thread may be subsequently made in this surface in order to fasten any desired part or machine element.

The advantage of the method according to the invention consists in the fact that two highly productive processes, internal high-pressure forming and upsetting, are combined at the same time in one process with the use of simple-to-produce machine elements to be connected to the hollow shaft. This results in very short production times.

A further advantage consists in the fact that, due to the method and the special configuration of the machine elements, in particular of the elements to be inserted into the hollow shaft, only a very small amount of rework becomes necessary. The hollow shafts produced according to the method, in particular camshafts for motor vehicle engines, are extremely light and very cost-effective.

BRIEF DESCRIPTION OF THE SEVERAL VIEWS OF THE DRAWING(S)

The prior art and the invention are described with reference to exemplary embodiments. In the associated drawings:

FIGS. 1a and b show embodiments of the ends of a hollow shaft according to the prior art, FIG. 2 shows a partial section through an IHF tool with inserted hollow shaft, FIGS. 3a to 3c show an embodiment of a hollow shaft with a firmly inserted element, FIG. 4 shows a partial section through a hollow shaft with inserted element and mounted cam, and FIG. 5 shows an embodiment of an end of the hollow shaft without an element remaining in it.

DETAILED DESCRIPTION OF THE INVENTION

FIGS. 1a and 1b show how an end of a hollow shaft is produced according to the prior art. In the region of one of its ends, the hollow shaft 1 is treated according to a swaging process known per se or also by upsetting in such a way that, with a constant outside diameter $D_A$ of the hollow shaft 1, the inside diameter $D_i$ of the hollow shaft 1 is reduced to the diameter $D_B$ of a bore 2. This means that material accumulation is effected in the end region. This upsetting is effected by heating, hammering or even by another forming process. Either the bore 2 is incorporated during this process and then has to be mechanically reworked, or the end of the hollow shaft 1 is completely closed and the bore 2 or a thread 3 is then incorporated after the machining of the end face.

The method according to the invention is described with reference to FIG. 2. Inserted into a known IHF tool 4 is a hollow shaft 1, the outside diameter $D_A$ of which corresponds to the inside diameter of the tool 4. At the same time, an element 5 whose outside diameter $D_E$ is slightly smaller than the inside diameter $D_i$ of the hollow shaft 1 is inserted into the hollow shaft 1 at a predetermined point. The tool 4, which is in two pieces as a rule, is closed. A plunger 6 of the tool 4 is moved axially under high pressure, with a pressure medium acting in the hollow shaft 1 at the same time, so as to press against the end face of the latter. In the process, the material of the hollow shaft 1 is upset in such a way that the element 5 is enclosed by the material of the hollow shaft 1 to such an extent that the previous inside diameter $D_i$ of the hollow shaft 1 is reduced to $D_{ii}$. The element 5 is thus connected under high pressure to the hollow shaft 1 in a positive-locking and/or frictional manner. At a line 7, an end section is cut off in a known manner, preferably by cut-off grinding, and a plane surface, in which a thread, for example, is incorporated, is produced.

Various embodiments of the element 5 are shown in FIGS. 3a to 3c. Depending on the effect of the plunger 6 and of the pressure medium and of the geometry of the element 5, the material of the hollow shaft 1 is upset in front of and behind the element 5, and the inside diameter $D_i$ of the hollow shaft 1 is reduced to $D_{ii}$. The plunger 6 of the IHF tool presses in the direction of the arrow. In the embodiment according to FIG. 3b, the pressure medium acts on both sides of the element 5 through the bore 8, although it only penetrates from one side. This embodiment of the element 5 is especially advantageous when the element 5 is arranged further away from the end of the hollow shaft 1. In FIG. 3a, the plunger 6 acts on one side and the pressure medium acts on the other side in order to obtain the material accumulation.

In FIG. 3c, the element 5 is of tapered design.

FIG. 4 shows how a machine element 9 or cam is mounted simultaneously on the hollow shaft 1 in the region of the element 5. According to FIG. 3b, the material is accumulated on both sides. It has surprisingly been found that, at this point of the hollow shaft 1, its outside diameter DA is increased and thus the machine element 9 mounted there is connected to the hollow shaft 1 simultaneously in a frictional and/or positive-locking manner.

With this example, it is shown how processes previously carried out separately can be executed in a single IHF process. An advantage of the method according to the invention results therefrom.

FIG. 5 shows another embodiment of the method. The plunger 6, which presses axially at the same time as the pressure medium acts, is firmly connected in its front part to the otherwise separate element 5, i.e. the plunger 6 is designed as element 5' on the front side. The material flow resulting during the method, during the thickness increase or upsetting, is limited on the inside by the element 5', the outside diameter of which ≦ the inside diameter of the hollow shaft 1, and thus material is brought locally outward but also inward in front of the element 5'. Unlike the examples of FIGS. 2 to 4, the complete plunger 6, 5' is removed from the hollow shaft 1 after completion of the IHF process. However, by appropriate design of the element 5' and of the IHF tool, the plunger 6 may also be connected to the hollow shaft 1 in a frictional and positive-locking manner and is mechanically separated from the element 5' after completion of the process.

The elements 5 and machine elements 9 or cams are produced in a known manner in a preceding process.

What is claimed is:

1. A method of producing a hollow shaft according to an internal high-pressure forming process (IHF), cams and/or machine elements being mounted on the outer lateral surface of the hollow shaft, in such a way as to be adapted to the use of the latter, in a frictional and/or positive-locking manner and so as to be distributed in functionally correct positions, wherein the cams and/or machine elements required for the function of the hollow shaft, when the hollow shaft is inserted at the point and position related to the function, are pushed onto the hollow shaft and positioned;

an element having approximately the same outside diameter as the inside diameter of the hollow shaft is positioned in at least one end of the hollow shaft;

the hollow shaft, with the cams and/or machine elements pushed onto it and with the inserted element, is inserted into an IHF tool;

after the IHF tool has been closed, a medium under the requisite high pressure in the hollow shaft is brought into effect;

at the same time as the medium acting from inside, at least one plunger is pressed axially against at least one end face of the hollow shaft in order thus to fill the IHF mold by the material flow caused by the pressure effect of the medium and by the mechanical pressure of the plunger, as a result of which the element is enclosed by the material of the hollow shaft, and the cams and/or machine elements are connected to the hollow shaft in a frictional and/or positive-locking manner by the widening of the hollow shaft; and in that that end of the hollow shaft which is closed by the element is mechanically treated in accordance with the function of the hollow shaft.

2. The method as claimed in claim 1, wherein the plunger acting axially against the end face of the hollow shaft, at its end directed in the direction of the hollow shaft, is designed in such a way that, after the completion of the IHF process, a defined recess is produced as termination of the hollow shaft by the withdrawal of the plunger.

3. The method as claimed in claim 1, wherein a plane surface is produced at the closed end of the hollow shaft by mechanical treatment and an internal thread or a bore is incorporated in this plane surface.

4. The method as claimed in claim 1, wherein a bolt or a threaded bolt is made on the element.

5. The method as claimed in claim 3, wherein the element inserted into the hollow shaft has already been given the approximate function-related form in a preceding mechanical process and is processed according to the IHF process so as to be true to size and compatible with the function.

6. The method as claimed in claim 1, wherein the machine elements, cams and elements are produced in a separate process.

7. The method as claimed in claim 1, wherein that end of the hollow shaft which is produced by the IHF process is mechanically reworked on the inside and/or outside.

8. The method as claimed in claims 1, wherein the hollow shaft, after the IHF process, is cut off in the region of the inserted element by a machining process, preferably by cut-off grinding, in such a way that a plane surface is produced.

9. The method as claimed in claim 8, wherein bores and threads are incorporated in the plane surface.

10. The method as claimed in claim 1, wherein the machine elements and/or cams and/or elements are produced from a material different from that of the hollow shaft.

11. The method as claimed in claim 2, wherein the IHF tool, in a defined region of the end of the hollow shaft to be produced, is increased in its inside diameter so that the outside diameter of the hollow shaft is increased in this region by the material flow.

12. A hollow shaft produced as claimed in claim 1, having cams and/or machine elements which are attached to the hollow shaft as a function of the use of the hollow shaft and which, on the hollow shaft widened by internal high-pressure forming, are frictionally connected to the hollow shaft in such a way as to be compatible with the function, characterized in that the hollow shaft is closed on at least one side in a frictional and/or positive-locking manner by an element, and in that the element is processed in such a way as to be adapted geometrically and mechanically to the function of the hollow shaft.

13. The hollow shaft as claimed in claim 12, wherein the element has a bore or an internal thread.

14. The hollow shaft as claimed in claim 12, wherein the element is designed as a bolt, pin or threaded bolt on its part extending over the hollow shaft.

15. The hollow shaft as claimed in claim 12, wherein the element is a solid bolt and is provided with a phase at least on one side.

16. The hollow shaft as claimed in claim 12, wherein the element has an axially continuous bore.

17. The hollow shaft as claimed claim 12, wherein the element has a reduced diameter in a region between its two ends.

18. The hollow shaft as claimed in claim 12, wherein the element is tapered in its outside diameter toward one end.

19. The method claimed in claim 1 wherein the hollow shaft is a camshaft.

20. The hollow shaft claimed in claim 12 wherein the hollow shaft is a camshaft.

* * * * *

UNITED STATES PATENT AND TRADEMARK OFFICE
CERTIFICATE OF CORRECTION

PATENT NO. : 6,961,998 B2 Page 1 of 1
APPLICATION NO. : 10/381037
DATED : November 8, 2005
INVENTOR(S) : Furchheim et al.

It is certified that error appears in the above-identified patent and that said Letters Patent is hereby corrected as shown below:

Please replace the Assignee name on the title page (73) of the patent from "Salzgitter Antriebstechnik GmbH & Co. KG" to --Linamar Antriebstechnik GmbH & Co. KG--.

Signed and Sealed this

Thirty-first Day of October, 2006

JON W. DUDAS
*Director of the United States Patent and Trademark Office*